United States Patent [19]

Sugahara et al.

[11] 4,329,182

[45] May 11, 1982

[54] GRANULAR STABILIZER FOR CHLORINE-CONTAINING POLYMERS

[75] Inventors: Yujiro Sugahara, Tokyo; Hiroyuki Naito, Tsuruoka; Mamoru Saito, Tsuruoka; Hisashi Tuchida, Tsuruoka, all of Japan

[73] Assignee: Mizusawa Kagaku Kogyo Kabushiki Kaisha, Osaka, Japan

[21] Appl. No.: 196,549

[22] Filed: Oct. 14, 1980

[51] Int. Cl.³ ............................................. C08L 91/00
[52] U.S. Cl. ................. 106/243; 260/435 R; 423/559; 524/399; 524/423; 523/200
[58] Field of Search .................... 106/243; 260/435 R; 423/559

[56] References Cited

U.S. PATENT DOCUMENTS 3,645,944  2/1972  White et al. ............... 260/45.75 V
4,117,104  9/1978  Sugahara et al. .................. 423/619

Primary Examiner—Lorenzo B. Hayes
Attorney, Agent, or Firm—Sherman & Shalloway

[57] ABSTRACT

Disclosed is a granular stabilizer for chlorine-containing polymers, which comprises porous spherical particles composed of randomly integrated needle crystals of a polybasic sulfuric acid/fatty acid lead salt having a chemical composition of 1 mole of $SO_3$, 3.7 to 4.5 moles of PbO and 0.06 to 1.27 moles of a higher fatty acid and also having X-ray diffraction peaks at spacings d of 2.95 Å and 3.27 Å, wherein the fatty acid component is enrolled in the surfaces of the respective needle crystals without substantial phase separation in the surfaces of the spherical particles.

5 Claims, 6 Drawing Figures

5μ

5 μ

10μ

10 μ

GRANULAR STABILIZER FOR CHLORINE-CONTAINING POLYMERS

BACKGROUND OF THE INVENTION

Field of the Invention

The present invention relates to a granular stabilizer for chlorine-containing polymers, which is excellent in the flowability of particles, the dispersibility or kneadability with a resin and the migration resistance in combination, and a process for the preparation thereof.

Tribasic lead sulfate and higher fatty acid lead salts such as lead stearate have heretofore been widely used as thermal stabilizers for chlorine-containing polymers such as vinyl chloride resins. Furthermore, a composite granular stabilizer comprising tribasic lead sulfate and such higher fatty acid lead salt has been proposed as a lead type stabilizer in which dusting or scattering is prevented and the dispersibility into a resin is improved.

For example, in Japanese patent publication No. 3554/66, we proposed a process for the preparation of a granular stabilizer, in which powder of tribasic lead sulfate is homogeneously mixed with a melt of a metal soap such as lead stearate to form a solid solution and the solid solution is molded into granules or small masses. In this process, in order to form this solid solution, it is necessary to use the metal soap in a relatively large amount as compared with the amount of the powdery stabilizer such as tribasic lead sulfate. Although a granular stabilizer of this type can be used for a rigid vinyl chloride resin composition, it cannot be used conveniently for a soft vinyl chloride resin composition. More specifically, if the granular stabilizer is used for a soft vinyl chloride resin composition, kneading with the resin becomes insufficient because of too large an external lubricity and also because of occurrence of migration phenomena such as plate-out and blooming of the metal soap, and therefore, it is practically very difficult or impossible to apply such granular stabilizer to a soft vinyl chloride resin composition.

Japanese patent publication No. 11491/67 discloses a granular stabilizer formed by wet-mixing tribasic lead sulfate with a higher fatty acid lead salt to form a heavy composite material and spray-drying and granulating the composite material. This process is advantageous in that a granular stabilizer can be obtained even if the higher fatty acid lead salt is used in a relatively small amount as compared with the amount of tribasic lead sulfate. However, it has been found that this granular stabilizer is still defective and insufficient in some points.

More specifically, even though the heavy composite material formed by wet-mixing tribasic lead sulfate with a higher fatty acid lead salt takes, in an aqueous medium, a uniform state in which respective particles of tribasic lead sulfate are coated with the fatty acid lead salt, in granules formed by spray-drying this composite material, the fatty acid lead salt is distributed in the state where the fatty acid lead salt separates and rises to the surfaces of the granules. The granular stabilizer having such distribution structure is inevitably poor in the dispersibility or particles of tribasic lead sulfate into a resin. This tendency is also observed in a granular stabilizer which is formed by adding an aqueous solution of a sodium salt of a fatty acid to tribasic lead sulfate formed by reaction of lead oxide with sulfuric acid, to form a coating of a fatty acid lead salt in situe, and spray-drying and granulating the coated tribasic lead sulfate, as taught in Japanese patent publication No. 7537/56.

It is believed that the above-mentioned defects of the known granular stabilizers are owing to the fact that though particles of tribasic lead sulfate are coated with a fatty acid lead salt, the degree of bonding of the fatty acid lead salt to the particles of tribasic lead sulfate is very low and phase separation of the fatty acid lead salt is promoted by heat applied at the spray-drying granulation step and consequent evaporation of water.

We found that when lead oxide, sulfuric acid and a higher fatty acid are reacted at a specific ratio under specific aging conditions, there can be obtained needle crystals of a novel polybasic sulfuric acid/fatty acid lead salt in which the fatty acid component is strongly bonded so that phase separation of the fatty acid component is not caused under spray-drying and granulating conditions, and that if these needle crystals are subjected to spray-drying granulation, rising of the higher fatty acid component to the surfaces of the granules is inhibited and a granular stabilizer for chlorine-containing polymers, which is excellent in the flowability of particles, the dispersibility or kneadability with a resin and the migration resistance in combination, can be obtained.

OBJECT OF THE INVENTION

It is therefore a primary object of the present invention to provide a granular stabilizer for chlorine-containing polymers, which is excellent in the flowability of particles, the dispersibility or kneadability with a resin and the migration resistance in combination, and a process for the preparation thereof.

Another object of the present invention is to provide a granular stabilizer which comprises granules of a novel polybasic sulfuric acid/fatty acid lead salt in which the fatty acid component is strongly bonded to such an extent that phase separation of the fatty acid component is not caused, wherein the respective crystalline particles constituting bodies of the granules have a good binding property, a good dispersion-promoting property and a good lubricating property.

Still another object of the present invention is to provide a granular stabilizer having a homogeneous internal structure, in which the flowability and dispersibility are highly improved by incorporation of a small quantity of a fatty acid component.

SUMMARY OF THE INVENTION

In accordance with the present invention, there is provided a granular stabilizer for chlorine-containing polymers, which comprises porous spherical particles composed of randomly integrated needle crystals of a polybasic sulfuric acid/fatty acid lead salt having a chemical composition of 1 mole of $SO_3$, 3.7 to 4.5 moles of PbO and 0.06 to 1.27 moles of a higher fatty acid and also having X-ray diffraction peaks at spacings d of 2.95 Å and 3.27 Å, wherein the fatty acid component is enrolled in the surfaces of the respective needle crystals without substantial phase separation in the surfaces of the spherical particles.

DETAILED DESCRIPTION OF THE PREFERRED EMBODIMENT

Figure 1:
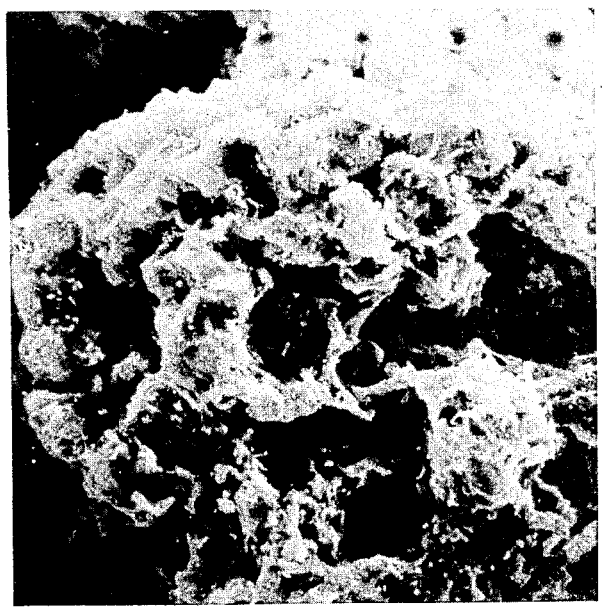
FIG. 1 is a scanning electron microscope photograph of a known granular stabilizer composed of a spray-drying granulation product of tribasic lead sulfate coated with a fatty acid lead salt.

One of important characteristic features of the present invention is that, independently from the conventional technical idea of coating the surfaces of tribasic lead sulfate particles with a fatty acid lead salt, needle crystals of a polybasic sulfuric acid/fatty acid lead salt having the fatty acid component enrolled therein are granulated into spherical particles. FIG. 1 is a scanning electron microscope photograph of a product obtained by forming in advance particles of tribasic lead sulfate, coating the surfaces of the particles with a fatty acid lead salt and spray-drying and granulating the coated particles. As is seen from FIG. 1, in this product, the fatty acid component (fatty acid lead salt) separates and rises to the surface portion of the granulation product, and in the granulation product having such distribution structure, since the included fatty acid component migrates to the surfaces of granules, crystalline particles of tribasic lead sulfate are tightly coagulated and agglomerated in the interior of the granulation product and a problem of insufficient dispersion should naturally arise when the granulation product is incorporated into a resin. In contrast, in the granulation product formed by spray-drying and granulating needle crystals of a polybasic sulfuric acid/fatty acid lead salt having the fatty acid component enrolled therein, as is seen from a scanning electron microscope photograph of FIG. 2, the tendency of the fatty acid component to rise to the surfaces of granules is not observed at all, and the entire structure inclusive of the interior is homogeneous and the granulation product has a very good dispersibility in a resin.

Not only from the fact that phase separation of the fatty acid component is not caused at the spray-drying and granulating step, but also from the fact that the polybasic sulfuric acid/fatty acid lead salt has a specific X-ray diffraction pattern, it is apparent that in the polybasic sulfuric acid/fatty acid lead salt according to the present invention, the fatty acid component is tightly enrolled.

Figure 3:
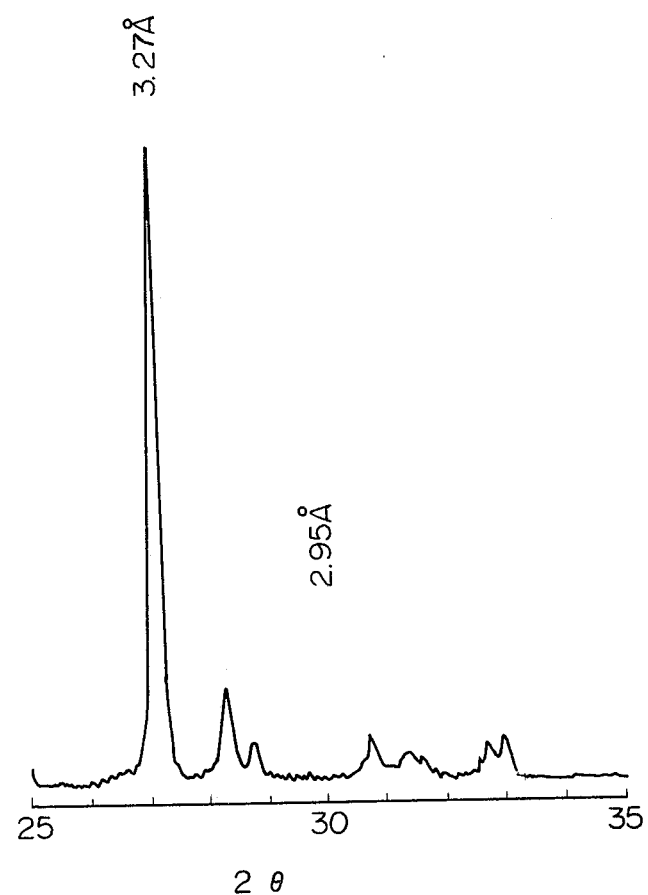
FIG. 3 shows an X-ray diffraction pattern of conventional tribasic lead sulfate coated with a fatty acid lead salt.
Figure 4:
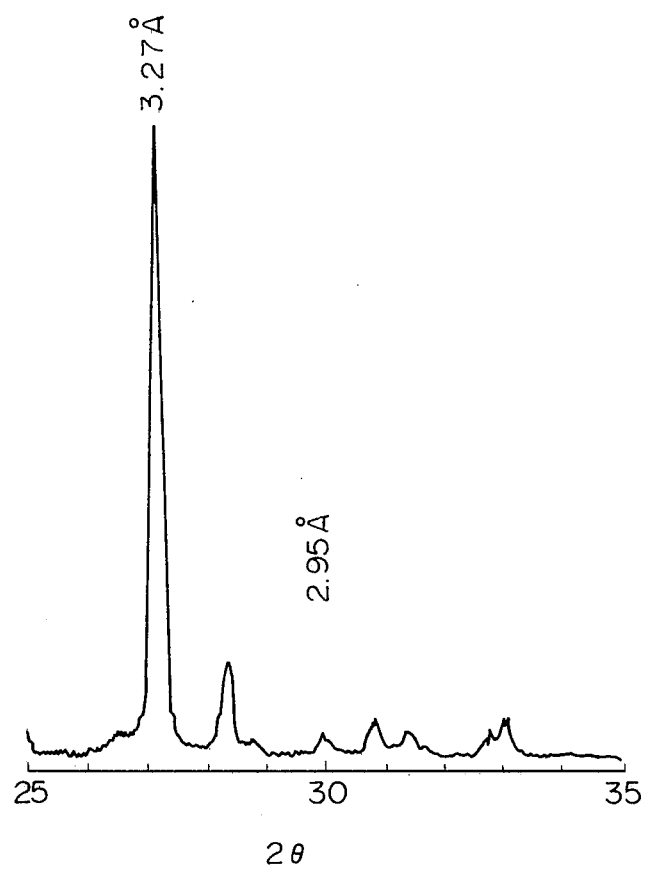
FIG. 4 shows an X-ray diffraction pattern of a polybasic sulfuric acid/fatty acid lead salt that is used in the present invention.

FIG. 3 shows an X-ray diffraction pattern of the conventional tribasic lead sulfate coated with a fatty acid lead salt, and FIG. 4 shows an X-ray diffraction pattern of the polybasic sulfuric acid/fatty acid lead salt that is used in the present invention.

When FIG. 4 is compared with FIG. 3, it will readily be understood that the polybasic sulfuric acid/fatty acid lead salt that is used in the present invention has at a spacing d of 2.95 Å a diffraction peak which is deemed inherent of the polybasic fatty acid salt. This fact indicates that the sulfuric acid component is enrolled in the lead salt in the form of tribasic lead sulfate and also the fatty acid component is enrolled in the lead salt in the form of the basic fatty acid lead salt.

From the viewpoints of the dispersibility and flowability of the granular stabilizer, it is preferred that the X-ray diffraction intensity ratio R represented by the following formula:

$$R = [I_{2.95}/I_{3.27}] \times 100$$

wherein $I_{2.95}$ represents the intensity of the X-ray diffraction peak at a spacing d of 2.95 Å and $I_{3.27}$ represents the intensity of the X-ray diffraction peak at a spacing d of 3.27 Å,
be in the range of from 3 to 30, especially from 5 to 25.

In order to attain the foregoing objects, it is important that the polybasic sulfuric acid/fatty acid lead salt that is used in the present invention should have the following chemical composition:

|  | Ordinary Range | Preferred Range |
| --- | --- | --- |
| $SO_3$ | 1 mole | 1 mole |
| PbO | 3.7–4.5 moles | 3.8–4.4 moles |
| fatty acid | 0.06–1.27 moles | 0.09–1.00 mole |

Figure 5:
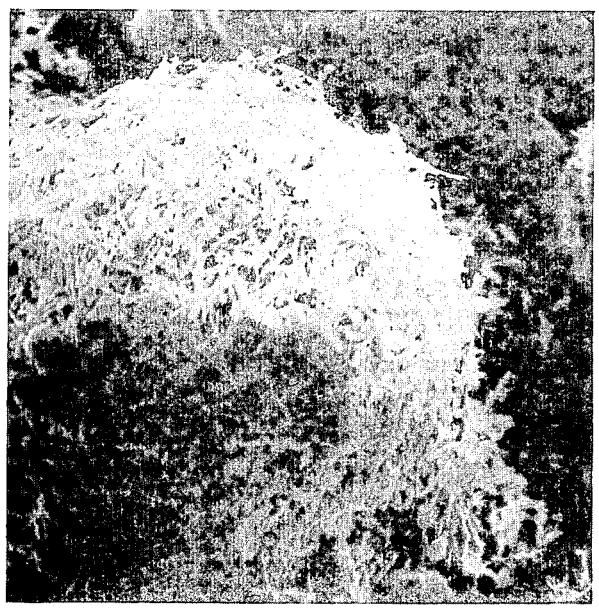
FIG. 5 is a scanning electron microscope photograph of particles (Sample No. 2-A) granulated from a polybasic sulfuric acid/fatty acid lead salt in which the amount of the fatty acid component is too small and below the range specified in the present invention.

If the amount of the fatty acid is too small and below the above range, in the granulation product obtained by spray-drying granulation, many whisker-like projections are formed on the surfaces of spherical particles as seen from FIG. 5, which is a scanning electron microscope photograph of a granular stabilizer of Sample No. 2-A formed as the comparative product in Example 2 given hereinafter, and the flowability of the granulation product is drastically reduced by the presence of these whisker-like projections. Of course, in such granulation product, the tendency of needle crystal particles to agglomerate is prominent and the dispersibility into a resin is very poor. This will readily be understood from the fact that in the granulation product formed by spray-drying granulation using the fatty acid in an amount in the range specified in the present invention, the number of the above-mentioned whisker-like projection is very small and the angle of repose is small (see FIG. 6 which is a scanning electron microscope photograph of a granular stabilizer of Sample No. 2-3 formed in Example 2 given hereinafter). If the amount of the fatty acid is too large and above the above-mentioned range, the external activity becomes too large, especially in a resin of a soft composition, and troubles such as insufficient molding and plate-out of the fatty acid component from the molded resin article are caused owing to insufficient gelation at the resin kneading and molding steps. In contrast, if the fatty acid component is incorporated in an amount in the above-mentioned range according to the present invention, good self-bonding property, good dispersibility into a resin and appropriate lubricity at the resin kneading and molding steps are imparted to the granulation product while the fatty acid component is enrolled in the needle crystals, and formation or growth of the above-mentioned whisker-like projections is inhibited (see FIG. 6) and the flowability of the granulation product is highly improved.

When the amount of the lead oxide component is too small and below the above-mentioned range, it becomes difficult to enroll the fatty acid component tightly in particles of needle crystals and the thermal stability is often reduced. When the amount of the lead oxide component is too large and above the above-mentioned range, coloration is often caused in the formed polybasic sulfuric acid/fatty acid lead salt and the resulting granulation product is not suitable for incorporation of a chlorine-containing polymer.

Ordinarily, the polybasic sulfuric acid/fatty acid lead salt that is used in the present invention is prepared by a process comprising reacting lead monoxide with sulfuric acid in an aqueous medium at a $PbO/SO_3$ weight ratio of from 92.3/7.7 to 91.1/8.9, adding a higher fatty acid in the form of an ammonium soap to the resulting slurry of polybasic lead sulfate having a fresh surface rich in the reactivity at a PbO/high fatty acid weight ratio of from 95.4/4.6 to 73.5/26.5, and aging the resulting mixture under such conditions that the specific surface area Rs ($cm^2/g$) defined by the following formula:

$$Rs = (2\gamma s + 4\gamma L)/\gamma s \cdot \gamma L \cdot D$$

wherein $\gamma s$ stands for the number average short diameter of needle crystals of the formed polybasic sulfuric acid/fatty acid lead salt, $\gamma L$ stands for the number average long diameter of said needle crystals, and D stands for the true density of said needle crystals, is 1 to 600, especially 1 to 100.

As the starting lead monoxide, there can be used commercially available litharge, that is, lead monoxide prepared by calcining lead suboxide, obtained by the lead powder method, at a temperature of 450° to 750° C. in an oxygen-containing atmosphere such as air. However, a polybasic sulfuric acid/fatty acid lead salt suitable for attaining the objects of the present invention is advantageously prepared by using lead monoxide formed according to the wet method previously proposed by us. As disclosed in American Patent Specification No. 4,117,104 according to this wet method, granular metallic lead, a liquid medium and oxygen are charged in a rotary drum and the drum is rotated under such conditions that the granules of metallic lead are exposed to the oxygen atmosphere above the liquid phase and the metallic lead granules have frictional contact with one another in the liquid medium, whereby liquid monoxide is obtained in the form of an aqueous dispersion. This lead monoxide according to the wet method has a true density of 8.3 to 9.2 g/cc and is composed of such fine particles as represented by a number average particle size of less than 0.2µ. Furthermore, this lead monoxide is easily reactive so that the chromic anhydride reactivity is at least 94% even in the absence of a catalyst such as acetic acid. Accordingly, the polybasic lead sulfate prepared from such lead monoxide is prominently excellent in the reactivity with the fatty acid component.

Reaction between lead monoxide and sulfuric acid is carried out by pouring sulfuric acid into an aqueous slurry of lead monoxide. This reaction can be accomplished either in the absence of a catalyst or in the presence of a catalyst such as acetic acid or nitric acid. When lead monoxide according to the dry method, which is poor in the reactivity, is used, it is preferred that a catalyst such as acetic acid be used in an amount of 0.001 to 1% by weight, especially 0.005 to 0.9% by weight, based on lead monoxide (PbO), that is, in an amount of up to 0.25 mole, especially up to 0.2 mole, per 100 moles of PbO. Pouring of sulfuric acid may be completed in such a short time as less than 30 seconds, or sulfuric acid may be poured gradually over a period of 0.5 to 60 minutes. The reaction temperature is not particularly critical, but it is preferred that the reaction be carried out at 15° to 95° C.

In the present invention, in order to enroll the fatty acid component tightly in the surfaces of the needle crystals and bond the fatty acid component strongly to the surfaces of the needle crystals, it is important that the reaction between lead monoxide and sulfuric acid should be carried out at the above-mentioned weight ratio.

In the present invention, in order to enroll the fatty acid component tightly in the surfaces of the needle crystals and bond the fatty acid component strongly to the surfaces of the needle crystals, it also is important that a higher fatty acid should be reacted in the form of an ammonium salt with polybasic lead sulfate having a fresh surface rich in the reactivity. In order to ensure this reaction between polybasic lead sulfate having a fresh surface rich in the reactivity and a higher fatty acid, a special care such as mentioned below should be taken.

(1) Sulfuric acid is poured into an aqueous slurry of lead monoxide, and at the point when the pH value of the reaction system becomes in the range of from 7.5 to 9.0, the fatty acid is immediately added. In short, the fatty acid is reacted with as-formed fresh polybasic lead sulfate.

(2) Coarse crystals of formed polybasic lead sulfate or secondary particles of agglomerated crystals are finely divided or disintegrated by a fine pulverizer such as a ball mill, a jet mill, a vibrating mill or a colloidal mill and the resulting finely divided polybasic lead sulfate is reacted with the fatty acid.

When the above-mentioned lead monoxide according to the wet method is used as the starting material, there can be obtained an intermediate, that is, polybasic lead sulfate, which is rich in the reactivity with the higher fatty acid.

In the present invention, in order to bond the fatty acid component strongly to the surfaces of the needle crystals while preventing occurrence of phase separation, it is important that the higher fatty acid should be reacted in the form of an ammonium salt (soap) with the above-mentioned intermediate. In order to bond the higher fatty acid strongly to the surfaces of the above-mentioned crystalline particles, the following two requirements should be satisfied. That is, the higher fatty acid should easily be dispersed in the aqueous slurry of the intermediate and the higher fatty acid should easily be bonded to the lead monoxide component in the intermediate. More specifically, even if the higher fatty acid per se is directly incorporated in the reaction system, it is very difficult to bond the fatty acid to the surfaces of the respective crystalline particles. When the higher fatty acid is incorporated in the form of an alkali metal salt such as a sodium salt, the higher fatty acid reacts only with the dissolved lead component (ordinarily, in the form of a salt of an acid used as the catalyst), that is, the free lead component separated from polybasic lead sulfate. In each of the above-mentioned two cases, it is difficult to form between the intermediate particles and the fatty acid component such a strong bonding as not causing phase separation at the heating granulation step. In contrast, it is believed that when the fatty acid component is used in the form of an ammonium salt, the ammonium salt is easily emulsified and dispersed in the aqueous medium and graft bonding is readily formed between the fatty acid component and the lead oxide component contained in the intermediate particles.

In the present invention, as the fatty acid, there can be used natural and synthetic fatty acids, especially those having 8 to 22 carbon atoms, such as stearic acid, lauric acid, palmitic acid, oleic acid, linoleic acid, ricinoleic acid, oxo method carboxylic acid and neo-acid. A mixed fatty acid formed by saponification of oil and fat can also be used.

It also is important that the mixture formed by adding the ammonium soap of the fatty acid to the slurry of the intermediate should be aged sufficiently so that the above-mentioned specific surface area Rs is in the range of 1 to 600 cm$^2$/g, especially 1 to 100 cm$^2$/g. In order to bond the fatty acid uniformly to the surfaces of the intermediate particles, it is preferred to carry out the aging treatment under certain constant conditions. However, if the aging treatment is conducted under such conditions, extreme growth of crystalline particles of the polybasic sulfuric acid/fatty acid lead salt is caused and the fatty acid component once bonded is likely to be expelled from the crystalline particles by this extreme growth, and phase separation of the fatty acid component is readily caused at the heating granulation step. Occurrence of this trouble is prevented in the present invention by carrying out the aging treatment under such conditions that the specific surface area Rs is in the above-mentioned range.

These aging conditions will now be described. The aging treatment is carried out under such agitation as will ensure homogeneous mixing in the aqueous medium, and the reaction temperature is chosen within the range of 25° to 85° C., especially 35° to 75° C., and the reaction time is selected within the range of 20 to 120 minutes, especially 30 to 90 minutes, so that the specific surface area Rs is in the above-mentioned range. The aging treatment may advantageously be carried out under a pulverizing action of a ball mill, an attritor or a colloidal mill. Furthermore, such pulverization treatment may be carried out before, during or after the aging treatment.

The so-obtained polybasic sulfuric acid/fatty acid lead salt is subjected to spray-drying granulation as it is in the form of the as-prepared aqueous slurry or after it has been filtered and washed with water, whereby porous spherical granules composed of randomly integrated needle crystals of the polybasic sulfuric acid/fatty acid lead salt are obtained. This granulation can easily be accomplished by spraying the aqueous slurry of the above-mentioned lead salt into a drying atmosphere through a nozzle, a rotary disc or a rotary cylindrical nozzle. It is preferred that the solid concentration in the slurry be 20 to 65% by weight, especially 35 to 55% by weight. It is preferred that the temperature of the drying atmosphere be adjusted to 100° to 500° C.

Although the size of the so obtained intended porous spherical granules differs according to the intended use, it is ordinarily preferred that the particle size be adjusted to 20 to 1000 microns, particularly 30 to 500 microns. Furthermore, it is preferred that the particle size distribution of the particles be concentrated in a region as narrow as possible.

In accordance with one preferred embodiment of the present invention, (A) the polybasic sulfuric acid/fatty acid lead salt is blended with (B) an alkaline earth metal type filler at an (A)/(B) weight ratio of from 95/5 to 30/70 and the resulting blend is granulated. It was found that according to this preferred embodiment, the dispersibility of the lead component (A), the flowability of particles of the lead component and the inhibition of dissolving-out of lead from the final molded resin article can remarkably be enhanced. More specifically, the alkaline earth metal type filler (B) added prior to granulation acts as a solid dispersion medium for dispersing the polybasic sulfuric acid/fatty acid lead salt in the granulation product in the finely divided state into a resin, and the alkaline earth metal type filler (B) further exerts functions of effectively preventing formation of whisker-like projections during the granulation step and improving the flowability of particles.

As the alkaline earth metal type filler that is used in the present invention, there can be mentioned inorganic compounds of alkaline earth metals such as calcium, magnesium, barium and strontium, such as carbonates, silicates, sulfates, phosphates, oxides and hydroxides of these alkaline earth metals. As preferred examples, there can be mentioned light calcium carbonate, heavy calcium carbonate, magnesium carbonate, calcium silicate, magnesium silicate, calcium-surface-treated siliceous sand, asbestos powder, talc (basic magnesium silicate), barite (barium sulfate), anhydrous gypsum, magnesium hydroxide, magnesium oxide, calcium phosphate powder, and mixtures of two or more of them. In the present invention, calcium carbonate is especially preferably used among these fillers. In order to attain the objects of the present invention, it is ordinarily preferred that the number average particle size of the alkaline earth metal type filler be 0.01 to 70$\mu$, particularly 0.05 to 50$\mu$.

Known additives such as a stabilizer assistant, a modifier and a coloring agent may be incorporated according to known recipes into the granular stabilizer of the present invention for chlorine-containing polymers according to need.

The granular stabilizer of the present invention is incorporated in an amount of 1 to 10% by weight into a chlorine-containing polymer such as a vinyl chloride resin, a chlorinated polyethylene resin, a chlorinated polypropylene resin or a chlorinated vinyl chloride resin, and the granular stabilizer is valuable for the manufacture of various molded articles of soft composition resins.

The present invention will now be described in detail with reference to the following Examples.

In the first place, the dry method and wet method for preparing lead monoxide that is used as the starting material of the polybasic sulfuric acid/sulfuric acid lead salt of the present invention (often referred to as "TBLSS" hereinafter) are described with reference to the following Referential Examples.

REFERENTIAL EXAMPLE 1

Lead monoxide according to the dry method was prepared according to the process disclosed in Japanese Patent Publication No. 11801/62. An ingot of electrolytic lead was shaped into columns having a diameter of 2.5 cm and a length of 2.0 cm by using a lead modling machine. According to the so-called Shimazu type lead powder method disclosed in the research report of Mr. Genzo Shimazu, Journal of Machine Association, 28, No. 100, pages 489–516 (1925), these columns of metallic lead were dry-pulverized in a rotary mill to form lead suboxide powder having a dark grayish green color (so-called lead powder). The lead suboxide powder was recovered, charged in a rotary furnace and fired under stirring in the presence of introduced oxygen at a temperature of about 630° to about 720° C. The elevation of the temperature by combustion of lead suboxide was traced, and when the temperature elevation by combustion was not observed any more, the product was promptly discharged into a cooling chamber and cooled to obtain lead oxide in the form of yellow granules. Then, this yellow granular lead oxide was pulverized and classified according to the gas cyclon method to obtain powdery lead monoxide (PbO-DP) having an orange color. In the preparation of TBLSS, this PbO-DP was wet-pulverized and dispersed in water to form a slurry having a predetermined concentration, and the PbO-DP was used in the form of this slurry (PbO-DS).

REFERENTIAL EXAMPLE 2

Lead monoxide according to the wet method was prepared according to the process disclosed in American Patent Specification No. 4117104. Namely, lead monoxide characterized by a density of 8.3 to 9.2 g/cc, an average particle size of less than $0.2\mu$, an infrared absorption peak at a wave number of 1400 to 1410 $cm^{-1}$ and a chromic anhydride reactivity of at least 94% was prepared according to the following procedures.

A rotary tube mill of stainless steel (having an inner diameter of 34.5 cm, a length of 130 cm and an inner volume of about 120 l) was charged with 200 Kg of metallic lead granules having a diameter of 2 to 7 mm, and 30 l of water and oxygen (2 $Kg/cm^2$ absolute pressure) were further charged in the tube mill. By rotating this tube mill, a part of metallic lead wetted with water was lifted up into the gas phase above the water level by the centrifugal force, and the ultra-thin layer of water around the lifted metallic lead absorbed oxygen while the granules of the metallic lead in water were brought into frictional contact with one another, whereby there was obtained a dispersion in which ultra-fine particles of lead monoxide were dispersed in water at a PbO concentration of 335 g/100 mg.

The so obtained lead monoxide slurry (PbO-WS) according to the wet method could be used directly as the starting material or it could be used in the form of a dry powdery product (PbO-WP) obtained by subjecting the above slurry to filtration, drying and pulverization.

EXAMPLE 1

A stabilizer consisting of porous spherical particles composed of randomly integrated needle crystals of a polybasic sulfuric acid/fatty acid lead salt (TBLSS) will be illustrated in this Example.

TBLSS was prepared according to the following procedures.

A 60-liter capacity vessel equipped with a high-speed stirrer and filled with 40 l of water was charged with 17.532 Kg of powdery lead monoxide (PbO-DP) prepared according to the above-mentioned dry method, and the charges were stirred at a high speed to disperse the lead monoxide sufficiently and homogeneously in water and the dispersion was heated at 65° C. Then, 109 cc of an aqueous solution of acetic acid having a concentration of 2.7 moles per liter was added to the dispersion to convert a part of lead monoxide to lead acetate. Then, 2702.6 cc of an aqueous solution of sulfuric acid having a concentration of 7.0 moles per liter was dropped to the dispersion over a period of 40 minutes. Then, aging was carried out under agitation at 65° C. for 60 minutes to form a slurry of needle crystals of a polybasic lead sulfate. Separately, a 10-liter capacity vessel of stainless steel was charged with 5 l of water maintained at 70° C. and 558 g of stearic acid was dissolved in this water. Then, 24 cc of 7 N aqueous ammonia was added to the solution and sufficiently emulsified under agitation to form an ammonia soap liquid. The so formed ammonia soap liquid was poured into the above-mentioned polybasic lead sulfate slurry over a period of 10 minutes, and aging reaction was carried out under high-speed agitation at 65° C. for 20 minutes to enroll stearic acid into the crystals of the polybasic lead sulfate and form a polybasic sulfuric acid/fatty acid lead salt (TBLSS). The so formed TBLSS slurry was sufficiently dispersed, and after coarse granules had been removed by sieving, the slurry was granulated to spherical particles under drying in a spray-drying device.

A spray tower having a diameter of 2.5 m and a height of 4.6 m was used as the spray-drying device, and spray drying was carried out at a temperature of 300° to 360° C. at a hot air feed rate of 36 to 40 $m^3/min$ and a slurry spray speed of 1 l/min in a countercurrent manner by using a rotary disc.

Thus, a granular product (Sample No. 1—1) of a basic sulfuric acid/fatty acid lead salt was obtained. The water content in the so obtained spherical TBLSS (1—1) was 0.1%.

The so obtained spherical TBLSS was subjected to chemical analysis, X-ray diffractiometry, scanning electron microscope observation, repose angle measurement, particle size distribution determination, pore volume measurement and measurements of thermal stability, dispersibility, gelation property and migration resistance in the state incorporated in a vinyl chloride resin according to test methods described below. The obtained results are shown in Table 1.

Test Methods (1) Chemical Analysis:

(1-a) Lead Monoxide (PbO):

The weight of a sample (containing about 0.15 g as PbO of the lead component) was precisely measured, and the sample was transferred to a separating funnel having a capacity of 100 ml by using 2 ml of 6 N nitric acid and 10 ml of ether and the sample was completely transferred to the separating funnel by using water.

The separating funnel was plugged and shaken, and then, 12 ml of a 50% aqueous solution of ammonium acetate was added and the funnel was sufficiently shaken to completely dissolve the sample in the liquid. Then, the funnel was allowed to stand still to separate the liquid into a water layer and an ether layer. The water layer was transferred to an Erlenmeyer flask having a capacity of 200 ml while about 0.5 ml of the water layer was left in the separating funnel. Then, 10 ml of water was added to the separating funnel, and the funnel was shaken again and allowed to stand still. In the same manner as described above, the water layer was transferred to the Erlenmeyer flask while about 0.5 ml of the aqueous layer was left in the funnel.

The above operation was repeated 3 times. Then, the ether layer and the inner wall of the separating funnel were washed with water, and finally, the water layer was transferred to the Erlenmeyer flask as much as possible. The so collected water layers and washing liquid in the Erlenmeyer flask having an inner capacity of 200 ml were gently heated until the ether smell disappeared.

Then, the content of the flask was naturally cooled below 40° C., and 5 ml of a 20% aqueous solution of potassium sodium tartrate was added into the 200-ml capacity flask and the flask was shaken. Then, 10 ml of an ammoniac buffer solution of ammonium chloride was added and the flask was sufficiently shaken.

Then, 2 ml of a 2% solution of potassium cyanide was added and 1 ml of a solution of Eriochrome Black T as an indicator was further added. Immediately, titration was carried out by using a standard solution of EDTA having a concentration of M/20 until the color was changed from reddish violet to sky blue.

The lead content was calculated according to the following formula:

$$\text{Lead content (\%)} = \frac{A \times B \times T}{W - \left(1 - \frac{C}{100}\right)}$$

wherein A stands for the Pb or asPb content calculation coefficient (=1.0360) or the PbO or asPbO content calculation coefficient (=1.1160), B stands for the amount (ml) titrated of the M/20 EDTA standard solution, T stands for the titer value of the M/20 EDTA standard solution, W stands for the weight (g) of the sample, and C stands for the water content (%) of the sample.

(1-b) Sulfuric Acid Radical ($SO_3$):

The sample (containing 0.1 to 0.2 g as $SO_3$ of the sulfuric acid component) was precisely weighed and charged in a beaker having a capacity of 300 ml. Then, 2 g of sodium chloride, 0.2 g of potassium brominate and 25 ml of hydrochloric acid (1:1) were added and the mixture was gently heated to decompose and dissolve the sample. Then, the solution was boiled under violent heating to blow off bromine. The solution was naturally cooled to a level not allowing precipitation of lead chloride and an aqueous solution of sodium hydroxide was added to the solution until the solution became weakly acidic. Then, a saturated aqueous solution of sodium carbonate was added dropwise to the solution by using a pipette to form a precipitate of lead carbonate. Then, a saturated aqueous solution of sodium carbonate was added to adjust the pH value to 9.

The precipitate was recovered by filtration using filter paper No. 3 manufactured by Toyo Roshi K. K., and the recovered precipitate was sufficiently washed with water until the presence of the sulfuric acid ion was not detected. The filtrate and washing liquid were charged in a beaker having a capacity of 300 ml. Then, hydrochloric acid (1:1) was dropped into the 300-ml capacity beaker to adjust the pH value to about 2, and the solution was heated and boiled to blow off carbon dioxide gas completely. Then, 20 ml of a 10% solution of barium chloride was dropped to the solution by using a pipette to form a precipitate of barium sulfate and then, aging was conducted under heating for 2 to 3 hours.

The precipitate was recovered by filtration using filter paper No. 5C manufactured by Toyo Roshi K. K. The recovered precipitate was sufficiently washed with hot water until the presence of the chlorine ion was not detected. The wathed precipitate was dried together with the filter paper, and after the filter paper was burnt to ash in a porcelain crucible, the precipitate was heated at 800° C. for 40 minutes.

Then, the heated precipitate was placed in a dessicator and naturally cooled until the amount became constant. The weight was measured and the sulfuric acid radical content was calculated according to the following formula:

$$SO_3 \text{ Content (\%)} = \frac{BaSO_4^* (g) \times 0.3430}{\text{sample (g)} \left[1 - \frac{\text{water content (\%)}}{100}\right]}$$

*$BaSO_4$ (g) = (measured weight − crucible weight − filter paper ash weight)

(1-c) Fatty Acid (R—COOH):

The sample (1 to 2 g) was precisely weighed and charged in a beaker having a capacity of 100 ml. The sample was wetted with a small quantity of ether and about 25 ml of water was added thereto. Then, 5 ml of 6 N nitric acid, 7 ml of 17 N acetic acid and 20 ml of 6 N aqueous ammonia were added to the mixture, and the mixture was heated at 70° C. under agitation to dissolve the sample. The insoluble fatty acid salt and coagulated fatty acid were recovered by using a filter paper, and the recovered solid was transferred to a separating funnel having a capacity of 100 ml by using water. Then, 5 ml of 6 N nitric acid was added to the solid, and the funnel was shaken. Then, 20 ml of ether was further added and the funnel was shaken. At this point, if the nitric acid layer was opaque or an insoluble substance was present in the boundary between the nitric acid layer and the ether layer, ether or a solution of ammonium acetate was added and the funnel was shaken.

Then, the nitric acid layer was removed, and the remaining ether layer was washed with 20 ml of water by shaking. The water layer was gently recovered, and the ether layer was charged in a 40-mm horizontal weighing bottle which had been dried and weighed in a thermostat drier maintained at 60°±5° C. Then, 10 ml of ether was added into the separating funnel and the funnel was shaken to wash the inner wall of the separating funnel, and the washing liquid was placed in the above weighing bottle. The weighing bottle was allowed to stand still to evaporate ether, and the weighing bottle was dried in a thermostat drier maintained at 60°±5° C., placed in a dessicator, naturally cooled and then weighed. The fatty acid content was calculated according to the following formula:

$$\text{Fatty Acid Content (\%)} = \frac{\text{weighed value (g)} - \text{weight (g) of weighing bottle}}{\text{sample (g)} \left[1 - \frac{\text{water content (\%)}}{100}\right]} \times 100$$

(1-d) Water ($H_2O$):

About 1 g of the sample was precisely weighed and placed on a 40-mm horizontal weighing bottle, and was dried for 4 hours in a thermostat drier maintained at 105°±5° C. so that the weight was not changed any more. The water content was calculated according to the following formula:

$$\text{Water Content (\%)} = \frac{\text{sample weight (g)} - \text{sample weight (g) after drying}}{\text{sample weight (g)}} \times 100$$

The chemical composition was determined by making calculations based on the so determined contents of the respective components.

Incidentally, each parenthesized value given hereinafter in indication of the chemical composition shows the mole number of PbO or stearic acid (St-H) per mole of $SO_3$.

(2) X-Ray Diffractiometry:

The sample was subjected to the X-ray diffractiometry according to the powder measuring method under conditions described below by using an automatic X-ray diffraction device manufactured by Rigaku Denki K. K. (including an X-ray generator Cat No. 2001, a broad-angle goniometer Cat No. 2227 and a proportional counter).

Diffraction Conditions:
  Target: Cu
  Filter: Ni
  Voltage: 30 KV
  Current: 15 mA
  Count range: 2000 c.p.s.
  High voltage: 1450 V
  Time constant: 1 second
  Chart speed: 1 cm/min
  Scanning speed: 1°/min
  Diffraction angle ($2\theta$): 10°–60°
  Slit width: 1°–0.3–1°

The areas of the diffraction intensity $I_{3.27}$ and diffraction intensity $I_{2.95}$ were determined from the heights and half widths of both the peaks at diffraction angles of 25.5° (d=3.27 A) and 30.0° (d 2.95) on the chart obtained according to the above-mentioned X-ray diffraction measuring method, and the ratio $I_{3.27}/I_{2.95}$ (=R) was calculated and the obtained value R was defined as the X-ray diffraction intensity ratio R.

(3) Scanning Electron Microscope Observation:

A scanning electron microscope Model JSM-U3 manufactured by Nippon Denshi K. K. was used.

The sample was suspended in isopropylene and collected on a screen mesh. After vacuum evaporation deposition conducted in an ion vacuum deposition device, the sample was placed in a sample chamber of the scanning electron microscope. Then, degasification was carried out in vacuum and electron rays were scanned. Scores of particles were observed while changing the magnifying power in the range of 100 to 3000 magnifications, and after focusing, photographs were taken.

(4) Number Average Particle Sizes (long diameter and short diameter):

Sampling was made on a collodion-carbon vacuum-deposited membrane according to the water paste method and by using a super-scope type electron microscope (JEM-50) manufactured by Nippon Denshi K. K., the sizes (long diameters and short diameters) of 50 to 200 particles were measured at 1000 to 10000 magnifications, and the number average particle size was determined from the number average large or short diameter ($\mu$) of the measured values.

(5) Angle of Repose (flowability):

A chemical funnel of glass having a mouth diameter of 100 mm was fixed so that the top end of the funnel was located at a height of 100 mm from the horizontal ground. The sample powder was let to fall down on a paper placed on the horizontal ground, on which two concentric circles having diameters of 50 mm and 100 mm, respectively, were drawn, through the fixed funnel toward the center of the circle having a diameter of 50 mm, which was drawn on the paper. When the bottom of a cone of the sample powder let to fall down through the funnel fully covered the circle having a diameter of 100 mm, falling of the sample powder was stopped. The weight X (mm) of the cone was measured, and the angle ($\theta$) of repose was calculated according to the following formula:

$$\tan \theta = (X/50)$$

The smaller is the value $\theta$, the better is the flowability of the sample powder. Ordinarily, if the value $\theta$ is smaller than 20°, blocking or bridging is not caused when the sample is discharged from a store tank such as a hopper, and a good flow is obtained.

(6) Thermal Stability:

To 100 parts by weight of a vinyl chloride resin (Viniclon 4000M manufactured by Mitsui Toatsu K. K.) was added 50 parts of DOP (dioctyl phthalate manufactured by Kyowa Hakko K. K.), and a predetermined amount (parts by weight) of the sample lead compound stabilizer was further added and the mixture was sufficiently blended to form a homogeneous composition. The composition was kneaded at 160° C. for 7 minutes by a 3.5-inch kneading roll to form a sheet having a thickness of about 0.5 mm. Then, 3 of the so formed sheets were piled and pressed at 165° C. under 100 Kg/cm² for 7 minutes to form one soft sheet having a thickness of about 1 mm. The sheet was cut into rectangular specimens having a size of about 3 cm×about 10 cm. The specimens were arranged on a silicone oil-coated stainless steel plate and exposed in a gear open maintained at 190° C. The time (minutes) required for blackening of the specimens by thermal decomposition was measured. A longer time required for blackening means a better thermal stability.

(7) Plasticizing Property:

An accessory roll mixer having a capacity of 60 cc was attached to a kneading resistance tester (Plasti-Corder Model P151 manufactured by Brabender Co.), and 55 g of a composition formed by mixing 100 parts of a vinyl chloride resin (Geon 103EP manufactured by Japanese Geon K. K.) with 5.0 parts of a stabilizer sample was charged in the mixer and kneaded at a temperature of 200° C. and a rotation number of 35 r.p.m. The plasticizing state of the resin mixture being kneaded under the above conditions was measured at predetermined intervals and the kneading resistance produced was recorded as a torque (Kg·m) on a chart. The point at which the kneading resistance torque reached a maximum value was defined as the plasticization point. The time required for arrival at this plasticization point was measured as the plasticization time Tp (gelation time) (minutes), and the maximum torque $\gamma$max (Kg·m) at this point was read from the chart.

Incidentally, when the lubricity of a resin-stabilizer composition is too high, the plasticization time (gelation time) is long and the maximum torque is low. On the other hand, when the lubricity of a resin-stabilizer composition is low, the plasticization time is short and the maximum torque is high. In case of a soft composition, since a plasticizer is incorporated, gelation by plasticization of the resin is less readily caused in the actual operation than expected from the data obtained according to the above mentioned method, and it often happens that preparation of the intended molded article becomes impossible.

(8) Dispersibility:

2.0 g of a homogeneous mixture of 100 parts of a commercially available vinyl chloride resin (Sumilit SX-11F manufactured by Sumitomo Kagaku K. K.) and 0.05 part of carbon black (Seast H manufactured by Tokai Denkyoku K. K.) was weighed by using an even balance (sensibility=0.1 g) and charged in a beaker having a capacity of 100 ml, and 12 g of DOP (manufactured by Kyowa Hakko K. K.) was added and 1 g of the sample was then added. The content of the beaker was let to fall down on kneading double rolls (frictional ratio=1.25) having the surface temperature maintained at 160° C. and having a diameter of 3.5 inches while the content was not substantially blended. After the composition had been kneaded for 10 minutes, it was withdrawn in the form of a black sheet having a thickness of 0.2 mm. The numbers of small white spots having a diameter of 0.1 to 0.2 mm, medium white soots having a diameter of 0.2 to 0.3 mm and large white spots having a diameter larger than 0.3 mm, which were formed on the black film sheet when the sample was not sufficiently dispersed, were counted over a square area of 100 mm×100 mm. When the total number of these white spots was large, the dispersibility was judged as being not good, and when such white spots were not observed, the dispersiblity was judged as being good.

(9) Transparency:

Pressed soft sheets prepared in the same manner as described in the preceding paragraph (8) were arranged on a black paper. When the black color of the black paper placed below the sheet could be seen through the sheet, the density of the black color was observed. When the black color of the paper was transparently or substantially transparently observed, the transparency was judged as being good and indicated by mark ⊚. When the black color of the paper was observed slightly opaquely, the transparency was judged as being fair and indicated by mark ◯. When the black color of the paper was seen whitish and opaque, the transparency was judged as being bad and indicated by mark X. When the density of the observed black color was high, the hiding power was small and the transparency of the sheet was excellent. That is, the light-transmitting property of the vinyl chloride resin was not degraded by the stabilizer sample incorporated into the resin. Ordinarily, when the stabilizer does not degrade the light-transmitting property of a base resin, the stabilizer promotes the coloring effect attained by incorporating a pigment or the like for coloring the resin into a desired hue and the amount of the pigment or the like necessary for obtaining the intended hue can be reduced.

(10) Migration Resistance (plate-out test):

The migration resistance was determined according to the Watchung Red method customary adopted as the plate-out test method. A composition of recipe A described below was kneaded at 150° C. for 10 minutes by using the abovementioned 3.5-inch kneading rolls which had been sufficiently cleaned. Immediately thereafter, a composition of recipe B described below was similarly kneaded by the same kneading rolls. The sheet obtained by kneading the composition of recipe B by using the kneading rolls just after kneading of the composition of recipe A was pressed at 160° C. for 5 minutes to form a sheet having a thickness of 1 mm. The red color of Watchung Red transferred to the kneading rolls from the composition of recipe A and then transferred to the sheet of the composition of recipe B from the kneading rolls was determined according to the density of the hue of Watchung Red. For this determination, in advance, Watchung Red was added to the composition of recipe B in 10 different amounts of 0.0005 g (0.5 mg) to 0.05 mg (50 mg) (per 1000 parts by weight of PVC), respectively, and 10 sheets different in the red color density were prepared and used as calibration sheets for determination of the color density. More specifically, the degree of the red color in the sample sheet prepared according to the above-mentioned method was compared with the red color degrees of these calibration sheets, and migration of Watchung Red caused by plate-out was evaluated based on the migration amount (mg) determined by the above-mentioned comparison of the color density of Watchung Red. As the migration amount (mg) of Watchung Red is large, plate-out is conspicuous and the migration resistance is low. In this case, blooming of white powder is caused on the resulting molded article and the surface becomes wet and sticky, with the result that various troubles are caused. In contrast, a small migration amount (mg) of Watchung Red indicates that the resin composition has an excellent migration resistance.

| Compositions (parts by weight) For Plate-Out Test | | |
|---|---|---|
| | Recipe A | Recipe B |
| Vinyl chloride resin (Viniclon 4000 M) | 100 | 100 |
| DOP | 50 | 40 |
| Watchung Red | 1 | 0 |
| Sample stabilizer | 2 | 0 |
| Titanium oxide | 0 | 2 |
| Dibutyl tin laurate | 0 | 2 |

(11) Pore Volume (cc/g):

Mercury was filled under a pressure of up to 1000 Kg/cm$^2$ into pores having a size of 75 to 75000 Å by a mercury porosimeter (Model Ag-65 manufactured by Carlo-Erba Co., Italy), and the total volume of pores having a diameter of 75 to 75000 Å was determined from the volume of mercury filled in the pores and the pore volume per unit area (cc/g) was calculated from this total volume.

(12) Particle Size Distribution:

The granular stabilizer formed by the spray-drying granulation method was passed through Tyler standard sieves of 325 mesh (43μ), 200 mesh (74μ), 100 mesh (140μ) and 42 mesh (355μ), and the particle size distribution was expressed in terms of proportions (% by weight) of the respective fractions.

COMPARATIVE EXAMPLE 1

A comparative product (a) prepared merely by homogeneously mixing tribasic lead sulfate with lead stearate and a comparative product (b) prepared by coating the surfaces of crystals of tribasic lead sulfate with lead stearate are illustrated in this Comparative Example.

Comparative Product (a):

Tribasic lead sulfate (TBL) was homogeneously mixed with lead stearate according to the following procedures.

A TBL slurry was prepared according to the method disclosed in Japanese Patent Publication No. 1149/67. More specifically, 8.162 Kg of powdery lead monoxide (PbO-DP) was charged in a high-speed stirrer-equipped, 60-liter capacity vessel filled with 10 l of water, and high speed agitation was conducted for 10 minutes to disperse the powder sufficiently homogeneously and the dispersion was heated at 65° C. Then, 50.8 cc of an acetic acid solution having a concentration of 2.7 moles/liter was added as a catalyst, and 1306 cc of sulfuric acid having a concentration of 7 moles/liter was dropped to the lead monoxide slurry over a period of 40 minutes and aging was conducted under agitation at 65° C. for 60 minutes to form a slurry of needle crystals of tribasic lead sulfate (Sample No. TBL-Hl).

Separately, 3.5 l of warm water maintained at 70° C. was charged in a stainless steel beaker having a capacity of 10 l, and 419 g of stearic acid was added and dissolved under heating. Then, 24.0 cc of 7 N aqueous ammonia was dropped to the solution and the mixture was stirred and homogeneously emulsified to form an ammonia soap liquid. Separately, 725 cc of a lead monoxide slurry (PbO-DS) having a concentration of 680 g/l, 1 l of water and 14.2 cc of acetic acid having a concentration of 2.7 moles/liter were charged in a high-speed stirrer-equipped stainless steel vessel having a capacity of 10 l, and the mixture was maintained at 70° C. The above-mentioned ammonia soap liquid was added to this lead monoxide slurry and reaction was carried out under agitation to form a lead stearate slurry.

The so formed lead stearate slurry was added to the above slurry TBL-Hl so that the amount of lead stearate was 9% by weight based on TBL in the slurry TBL-Hl. Both the slurries were mixed under agitation and immediately, the mixture was spray-dried in the same manner as described in Example 1. Thus, the mixture was granulated to spherical particles while it was being dried, whereby a granulation product (Sample No. H-1) composed of a mixture of TBL crystals with lead stearate was prepared.

Comparative Product (b):

The surfaces of crystals of tribasic lead sulfate were coated with lead stearate in the following manner according to the method disclosed in Japanese Patent Publication No. 7537/56.

Crystals of TBL (Sample No. TBL-Hl) prepared according to the above-mentioned method adopted for production of the comparative product (a) were chosen as the tribasic lead sulfate crystals. In all slurry of tribasic lead sulfate TBL-Hl having a concentration of 79.2%, 9.029 l of a 5% aqueous solution of sodium stearate was incorporated, and the mixture was stirred for 20 minutes to effect the coating treatment. Then, the slurry was washed with water and filtered, and the cake was formed into a homogeneous slurry having a concentration of 48.2% again. The slurry was fed to the spray-drying device and granulated to spherical particles under drying in the same manner as described in Example 1, to obtain a granulation product (Sample No. H-2) comprising TBL crystals having the surfaces coated with lead stearate.

The properties of the so obtained two granulation products were measured and tested according to the test methods described in Example 1 to obtain results shown in Table 1.

From the results of the tests made on the products of Example 1 and Comparative Example 1, the following can be seen. The granular stabilizer of the present invention prepared by first forming crystals of a tribasic sulfuric acid/fatty acid lead salt and granulating the crystals into spherical particles according to the spray-drying method consists of porous spherical particles composed of randomly integrated needle crystals as shown in the scanning electron microscope photograph. From the data of the pore volume, it is seen that the comparative products have larger pores than the product of the present invention. In the comparative product (b), the phase of the stearic acid component is separated and the stearic acid component is present mainly in the outer portions of spherical particles, and although the repose angle of this comparative product, which indicates the flowability at handling, is small and less than 30°, this product was much inferior to the product of the present invention in the dispersibility in a resin when it is mixed and kneaded with the resin. Moreover, the thermal stability of the comparative products is very poor, and because of a poor compatibility of the stearic acid component with the resin, the migration amount of Watchung Red is large in the comparative products and hence, the migration resistance is poor, if comparison is made based on the same amount of stearic acid incorporated in the resin composition. In contrast, the migration amount of Watchung Red is very small in the product of the present invention. It is believed that this reduction of the migration amount is due to formation of the polybasic sulfuric acid/fatty acid lead salt. From the foregoing, it will readily be understood that when the fatty acid component is sufficiently enrolled in lead sulfate crystals at the aging step for synthesizing the polybasic sulfuric acid/fatty acid lead salt and the aging reaction product is granulated according to the spray-drying method, spherical particles which are easy to handle can be obtained and a good dispersibility is exerted when the so formed granular stabilizer is incorporated in and kneaded with a resin.

TABLE 1

Figure 2:
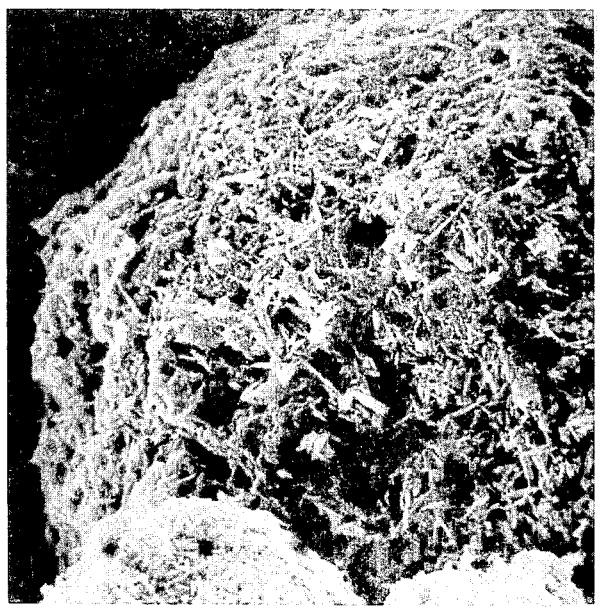
FIG. 2 is a scanning electron microscope of a granular stabilizer according to the present invention.

|  | Sample No. | | |
| --- | --- | --- | --- |
|  | 1-1 | H-1 | H-2 |
| Chemical Analysis (%) | | | |
| PbO | 86.55 | 86.60 | 86.42 |
|  | (4.26 moles) | (4.25 moles) | (4.28 moles) |
| $SO_3$ | 7.28 | 7.31 | 7.23 |
| St-H | 4.17 | 4.19 | 4.21 |
|  | (0.16 moles) | (0.16 moles) | (0.16 moles) |
| Peak Area (cm$^2$) in X-Ray Diffractiometry | | | |
| d = 3.27 Å | 2.13 | 2.20 | 2.11 |
| d = 2.95 Å | 0.099 | 0 | 0 |
| Scanning Electron Microscope Photograph | FIG. 2 | FIG. 1 | — |
| Repose Angle (°) | 27.5 | 22.5 | 33.0 |
| Thermal Stability (minutes) | 253 | 208 | 188 |
| Plasticizing Characteristic | | | |
| maximum torque (kg · m) | 4.7 | 4.2 | 4.1 |
| plasticization time (minutes) | 3.3 | 3.5 | 3.6 |
| Dispersibility (number of white spots) | 5 | many | many |
| Migration Resistance (mg) | 1.0 | 20.0 | 40.0 |
| Transparency | ○ | ○ | ○ |
| Pore Volume (cc/g) | 0.652 | 0.815 | 0.823 |
| Particle Size Distribution (%) | | | |
| 43~74 μ | 50 | 20 | 46 |

TABLE 1-continued

| | Sample No. | | |
|---|---|---|---|
| | 1-1 | H-1 | H-2 |
| 74~140 μ | 40 | 59 | 38 |
| 140~350 μ | 10 | 21 | 16 |

EXAMPLE 2

In this Example, spherical TBLSS granulation products differing in the composition were prepared by using wet method litharge as the starting material and stearic acid as a typical instance of the higher fatty acid and enrolling stearic acid in needle crystals.

The wet method litharge slurry (PbO-WS) having a PbO concentration of 335 g/l, prepared according to the method described in Referential Example 2, was used. The respective starting materials were used in amounts shown in Table 2. The wet method litharge slurry was heated at about 40° C. and 20 g of crystalline powder of hydroxylamine sulfate was added to the slurry under agitation. The mixture was agitated for 10 minutes, and a predetermined amount of 7.0 N sulfuric acid was poured into the mixture within about 5 minutes. The mixture was stirred at 40° C. for 25 minutes to form crystals of polybasic lead sulfate, and a predetermined amount of an ammonium stearate soap liquid prepared according to the method described in Example 1 was added and the stearic acid-enrolling aging reaction was carried out at 50° C. under agitation for 25 minutes. The resulting TBLSS slurry was sprayed in hot air through a rotary disc in the same manner as described in Example 1. Thus, spherical granulation products (Samples Nos. 2-1 through 2-7) differing in the amount enrolled of stearic acid were prepared.

Comparative granular products were prepared in the same manner as described above except that the amount enrolled of stearic acid was too small (less than 0.06 mole per mole of SO₃) (Sample No. 2-A) or stearic acid was not added at all (Sample No. 2-B).

The so obtained spherical TBLSS granulation products were tested according to the methods described in Example 1. The obtained results are shown in Table 3.

Figure 6:
FIG. 6 is a scanning electron microscope photograph of a granular stabilizer (Sample No. 2-3) according to the present invention.

From the results shown in Table 3, the following can be seen. When the amount enrolled of stearic acid is too small and less than 0.06 mole per mole of SO₃ or stearic acid is not added at all, the repose angle of the resulting spherical TBLSS granulation product is large and the flowability is drastically reduced. This can also be understood when FIGS. 5 and 6 are compared with each other. Namely, when the amount of stearic acid is small, whisker-like projections are formed on the surfaces of spherical granules. Thus, it can be understood that good results will be obtained when stearic acid is enrolled in crystals in an amount of at least 0.06 mole per mole of SO₃ according to the present invention. However, if the amount enrolled of stearic acid is too large, the migration resistance is reduced.

When wet method litharge is used as the starting material, the reaction is completed in the absence of a catalyst, though the presence of a catalyst is indispensable when conventional calcined litharge is used as the starting material. Therefore, the mother liquor left after recovery of TBLSS can be used again as the reaction medium, with the result that the problem of the waste water treatment for prevention of environmental pollution can be solved effectively.

TABLE 2

| Sample No. | Amount (kg as PbO) of Litharge | Amount (g as SO₃) of Sulfuric Acid | Amount (g as H-St) of Stearic Acid |
|---|---|---|---|
| 2-1 | 1.74 | 146 | 68 |
| 2-2 | 1.71 | 144 | 102 |
| 2-3 | 1.64 | 138 | 171 |
| 2-4 | 1.57 | 131 | 258 |
| 2-5 | 1.49 | 124 | 347 |
| 2-6 | 1.41 | 117 | 436 |
| 2-7 | 1.67 | 135 | 149 |
| 2-A (comparison) | 1.76 | 147 | 147 |
| 2-B (comparison) | 1.78 | 149 | 149 |

TABLE 3

| | Sample No. | | | | | | | | |
|---|---|---|---|---|---|---|---|---|---|
| | 2-1 | 2-2 | 2-3 | 2-4 | 2-5 | 2-6 | 2-7 | 2-A (comparison) | 2-B (comparison) |
| Chemical Analysis (%) (moles) | | | | | | | | | |
| PbO | 86.80 | 85.28 | 82.21 | 78.31 | 74.36 | 70.35 | 83.57 | 88.10 | 89.21 |
| | (4.25) | (4.26) | (4.27) | (4.28) | (4.29) | (4.30) | (4.45) | (4.30) | (4.30) |
| SO₃ | 7.32 | 7.18 | 6.90 | 6.56 | 6.21 | 5.86 | 6.73 | 7.34 | 7.44 |
| St-H | 3.40 | 5.11 | 8.56 | 12.92 | 17.33 | 21.81 | 7.43 | 1.25 | 0 |
| | (0.130) | (0.200) | (0.349) | (0.554) | (0.785) | (1.046) | (0.310) | (0.048) | — |
| X-Ray Diffraction Peak Area (cm²) | | | | | | | | | |
| d = 3.27 Å | 2.13 | 2.12 | 2.12 | 2.10 | 2.10 | 2.09 | 2.11 | 2.10 | 2.12 |
| d = 2.95 Å | 0.100 | 0.098 | 0.098 | 0.098 | 0.096 | 0.095 | 0.097 | 0 | 0 |
| Thermal Stability (minutes) | 250 | 250 | 240 | 240 | 240 | 235 | 240 | 210 | 210 |
| Dispersibility (number of white spots) | 8 | 5 | 5 | 5 | 2 | 0 | 5 | many | many |
| Transparency | ○ | ○ | ○ | ○ | ○ | ○ | ○ | ○ | ○ |
| Plasticizing Characteristic | | | | | | | | | |
| plasticization time (minutes) | 3.6 | 3.5 | 3.4 | 3.4 | 3.2 | 3.0 | 3.4 | 3.5 | 3.6 |
| maximum torque (Kg . m) | 4.7 | 4.5 | 4.5 | 4.2 | 4.1 | 4.1 | 4.4 | 4.2 | 4.2 |
| Migration Resistance (mg) | 1.0 | 1.0 | 5.0 | 10.0 | 20.0 | 25.0 | 2.0 | 35.0 | 1.0 |
| Repose Angle (°) | 27.5 | 26.0 | 25.5 | 24.0 | 23.0 | 21.0 | 25.5 | 36.0 | 38.0 |
| Pore Volume (cc/g) | 0.655 | 0.635 | 0.620 | 0.610 | 0.605 | 0.580 | 0.625 | 0.817 | 0.855 |
| Particle Size Distribution (%) | | | | | | | | | |
| 43-74 μ | 50 | 52 | 56 | 54 | 53 | 56 | 55 | 52 | 48 |
| 74-140 μ | 42 | 40 | 40 | 44 | 43 | 42 | 40 | 40 | 44 |
| 140-350 μ | 8 | 8 | 4 | 2 | 4 | 2 | 5 | 8 | 8 |

EXAMPLE 3

In this Example, an alkaline earth metal type filler was homogeneously and intimately mixed into crystals of a polybasic sulfuric acid/fatty acid lead salt and the mixture was granulated into spherical particles.

As the polybasic sulfuric acid/fatty acid lead salt crystal slurry, TBLSS (Sample No. 2—2) prepared from wet method litharge in Example 2 was chosen and used.

Among commercially available chemicals, the following 13 alkaline earth metal type fillers where chosen and used: light calcium carbonate, heavy calcium carbonate, anhydrous calcium sulfate, finely divided gypsum hemihydrate, anhydrous calcium sulfite, calcium silicate, magnesium carbonate, basic magnesium carbonate, strontium carbonate, barium carbonate, barium sulfate, calcium phosphite and calcium aluminate. Furthermore, a commercially available non-toxic stabilizer composed of calcium silicate (CASH manufactured by Mizusawa Kagaku Kogyo K.K.) was used as the filler.

Each filler was used after it had been pulverized and sieved so that the particle size was less than 10μ.

The TBLSS slurry (2—2) was homogeneously and intimately mixed with the above inorganic filler in the following manner.

The inorganic filler in an amount shown in Table 4 (% based on the mixture) was added to the TBLSS slurry maintained at about 40° C., and the mixture was stirred at a high speed for 15 minutes. Then, the mixed homogeneous slurry was passed through a colloidal mill rotated at a high speed to effect pulverization, and the mixture was granulated into spherical particles under heating in the spray-drying device in the same manner as described in Example 1. Thus, porous granular stabilizers (Samples Nos. 3-1 through 3-24) composed of homogeneous TBLSS-filler mixtures were prepared.

When the particle size distribution was determined, it was found that each product comprised 50 to 55% of particles having a size of 43 to 74μ, 35 to 40% of particles having a size of 74 to 140μ and 5 to 10% of particles having a size of 140 to 350μ.

The so obtained spherical granular stabilizers were tested according to the methods described in Example 1. The obtained results are shown in Table 4.

For comparison, calcium carbonate selected as the filler was not mixed into TBLSS in advance, but it was incorporated when TBLSS was added to a resin (Sample No. 3-A). Also in this comparative run, the tests were similarly conducted. The obtained results are shown in Table 4.

From the results shown in Table 4, it will readily be understood that spherical particles of homogeneous mixtures of a polybasic sulfuric acid/fatty acid lead salt with various inorganic fillers have a repose angle suitable for handling, a better dispersibility than that of the spherical particles composed solely of TBLSS and a good thermal stability even if the substantial amount of TBLSS incorporated in a resin is small. These advantages will become more apparent when the test results of the products according to the present invention are compared with the test results of the comparative product.

TABLE 4

| Sample No. | Filler | Amount (%) of Filler | Thermal Stability (minutes) | Dispersibility (number of white spots) | Transparency | Repose Angle (°) |
|---|---|---|---|---|---|---|
| 3-1 | light calcium carbonate | 25 | 230 | 0 | ◉ | 28.0 |
| 3-2 | heavy calcium carbonate | 5 | 240 | 0 | ◉ | 29.5 |
| 3-3 | heavy calcium carbonate | 5 | 240 | 0 | ◉ | 29.0 |
| 3-4 | heavy calcium carbonate | 20 | 240 | 0 | ◉ | 27.0 |
| 3-5 | heavy calcium carbonate | 30 | 200 | 0 | ◉ | 27.0 |
| 3-6 | heavy calcium carbonate | 50 | 140 | 0 | ◉ | 27.0 |
| 3-7 | heavy calcium carbonate | 70 | 80 | 0 | ◉ | 26.0 |
| 3-8 | anhydrous calcium sulfate | 20 | 230 | 0 | ○ | 28.0 |
| 3-9 | gypsum hemihydrate | 20 | 240 | 0 | ○ | 28.0 |
| 3-10 | anhydrous calcium sulfate | 20 | 240 | 0 | ○ | 28.0 |
| 3-11 | calcium silicate | 20 | 240 | 0 | ○ | 28.0 |
| 3-12 | magnesium carbonate | 20 | 220 | 0 | ◉ | 28.0 |
| 3-13 | basic magnesium carbonate | 20 | 220 | 0 | ◉ | 28.0 |
| 3-14 | strontium carbonate | 20 | 220 | 0 | ○ | 28.0 |
| 3-15 | barium carbonate | 20 | 230 | 0 | ○ | 28.0 |
| 3-16 | barium sulfate | 20 | 220 | 0 | ○ | 28.0 |
| 3-17 | calcium phosphite | 22 | 240 | 0 | ◉ | 28.0 |
| 3-18 | calcium phosphate | 20 | 240 | 0 | ◉ | 28.0 |
| 3-19 | calcium aluminate | 20 | 220 | 0 | ○ | 29.0 |
| 3-20 | CASH | 10 | 240 | 0 | ○ | 27.0 |
| 3-21 | CASH | 20 | 240 | 0 | ○ | 26.0 |
| 3-22 | CASH | 25 | 240 | 0 | ◉ | 26.0 |
| 3-23 | CASH | 30 | 220 | 0 | ◉ | 25.0 |
| 3-24 | CASH | 40 | 200 | 0 | ◉ | 24.0 |
| 3-A | heavy calcium carbonate | 30 | 180 | many | ◉ | — |

In order to demonstrate more clearly the effect attained by homogeneously and intimately mixing TBLSS with an alkaline earth metal type filler in advance, the amount of lead dissolved out when a molded article of a resin composition including the granular stabilizer of the present invention was dipped in water was measured according to the method described below. The obtained results are shown in Table 5.

The granular stabilizer (Sample No. 3-4) prepared by homogeneously and intimately mixing heavy calcium carbonate with the TBLSS slurry and spray-drying and granulating the mixture in the spray-drying device was chosen as the sample.

The amount of lead dissolved out was determined according to the following method.

(13) Amount of Dissolved-Out Lead Component:

The test was carried out according to the standard method of determining lead dissolved out from a city service water pipe composed of a vinyl chloride resin.

A test sheet was prepared from a rigid composition. More specifically, 3 parts by weight of the sample stabilizer was added to 100 parts by weight of a vinyl chloride resin (Viniclon 4000M manufactured by Mitsui Toatsu K.K.) and the blend was sufficiently mixed to form a homogeneous mixture. The mixture was kneaded at 160° C. for 5 minutes by using the kneading rolls described in the paragraph "Thermal Stability" in Example 1 to form a sheet having a thickness of 0.4 to 0.5 mm. Then, 3 of the so prepared sheets were piled and pressed at 170°±2° C. under 100 Kg/cm² for 7 minutes to form a rigid sheet having a thickness of about 1 mm.

The sheet was cut into square specimens having a size of 8 cm×8 cm, and substances adhering to the surfaces of the specimens were wiped away by using dry cotton gauze and the specimens were heated for 5 minutes in a thermostat tank maintained at 100°±3° C. The softened specimens were wound on a hard glass tube having a diameter of about 30 mm (100-ml capacity graduated cylinder) to form a cylindrical molded article.

Extraction of the lead component was carried out in the following manner.

Deionized water was distilled and condensed, and a commercially available chlorine solution was added so that the effective chlorine concentration was about 2 ppm. Then, the pH value was adjusted to 7±0.05 by using sodium carbonate. The so formed solution was used as the extraction solvent. The above-mentioned molded article was washed with running water (city service water fed at a rate of about 2 l/min) for 30 minutes and rinsed with the above-mentioned extraction solvent. Separately, a plugged cylinder of hard glass for extraction, which had an inner diameter of 60 mm and a height of 150 mm, was filled with 246 ml of the extraction solvent, and the molded article was charged in the cylinder. The cylinder was sealed and allowed to stand for 24 hours in a thermostat tank maintained at 25°±1° C.

After the above-mentioned extraction treatment, the Pb content in the extraction solvent was determined according to the known dithizone method. The Pb concentration in the extraction solvent was expressed in the unit of ppm.

For comparison, the product in which calcium carbonate had not been incorporated (Sample No. 3-B), which corresponded to the granular TBLSS stabilizer (Sample No. 1—1) prepared in Example 1, and the product formed by incorporating calcium carbonate at the step of adding the above TBLSS No. 1—1 to the PVC resin without preliminary admixing of calcium carbonate (Sample No. 3-C), were similarly tested according to the above-mentioned method. The obtained results are shown in Table 5.

TABLE 5

| Stabilizer Sample No. | Amount (PHR) of Granular Stabilizer | Theoretical Amount (PHR) of TBL in PVC | Amount (ppm) of Lead Dissolved-Out |
|---|---|---|---|
| 3-5 | 5 | 3.5 | 0.026 |
| 3-A | 5 | 5 | 0.080 |
| 3-B | 3.5 | 3.5 | 0.055 |
| 3-C | 5 | 3.5 | 0.050 |

From the foregoing test results, it will readily be understood that when calcium carbonate is intimately mixed in advance with TBLSS, dissolution of lead from the resulting molded article can effectively be controlled. As is seen from the results shown in Table 5, when calcium carbonate is not mixed with TBLSS in advance but it is incorporated when TBLSS is added to a PVC resin, the effect of controlling dissolution of the lead component is hardly improved (see the results of Sample No. 3-B). The reason for this phenomenon has not been elucidated completely, but it is believed that as pointed out hereinbefore, the alkaline earth metal type filler incorporated in the homogeneously admixed state acts as a solid dispersion medium and exerts a function of finely dividing and dispersing TBLSS particles in a chlorine-containing polymer. Accordingly, it is considered that as TBLSS is dispersed in the chlorine-containing polymer in the highly finely divided state, the absolute amount of TBLSS exposed to the surface of the molded article is reduced and the amount of lead dissolved out is accordingly reduced. The lead component dissolved out from a molded article of a chlorine-containing polymer in which TBLSS has been incorporated is deemed to be lead chloride formed at the molding step. It is construed that the alkaline earth metal type filler intimately admixed and incorporated in TBLSS will exert a function of decomposing such lead chloride to insoluble substances, rather than a function of dissolving out lead chloride.

What is claimed is:

1. A granular stabilizer for chlorine-containing polymers, which comprises porous spherical particles composed of randomly integrated needle crystals of a polybasic sulfuric acid/fatty acid lead salt having a chemical composition of 1 mole of $SO_3$, 3.7 to 4.5 moles of PbO and 0.06 to 1.27 moles of a higher fatty acid and also having X-ray diffraction peaks at spacings d of 2.95 Å and 3.27 Å, wherein the fatty acid component is enrolled in the surfaces of the respective needle crystals without substantial phase separation in the surfaces of the spherical particles.

2. A granular stabilizer as set forth in claim 1, wherein the porous spherical particles contain an alkaline earth metal compound filler in such an amount that the weight ratio (A)/(B) of (A) the polybasic sulfuric acid/fatty acid lead salt to (B) the alkaline earth metal filler is in the range of from 95/5 to 30/70.

3. A granular stabilizer as set forth in claim 1, wherein said polybasic sulfuric acid/fatty acid lead salt has an X-ray diffraction intensity ratio R of from 3 to 30, said X-ray diffraction intensity ratio R being represented by the following formula:

$$R = [I_{2.95}/I_{3.27}] \times 100$$

wherein $I_{2.95}$ represents the intensity of the X-ray diffraction peak at a spacing d of 2.95 Å and $I_{3.27}$ represents the intensity of the X-ray diffraction peak at a spacing d of 3.27 Å.

4. A granular stabilizer as set forth in claim 1, wherein the polybasic sulfuric acid/fatty acid lead salt has a chemical composition of 1 mole of $SO_3$, 3.8 to 4.4 moles of PbO and 0.09 to 1.00 mole of the fatty acid.

5. A granular stabilizer as set forth in claim 1, which is formed by blending (A) the polybasic sulfuric acid/fatty acid lead salt with (B) an alkaline earth metal compound filler at a weight ratio (A)/(B) of from 95/5 to 30/70.

* * * * *